Sept. 28, 1943.   A. FLAMM   2,330,699
CONTAINER CARRIER
Filed Feb. 21, 1942   2 Sheets-Sheet 1
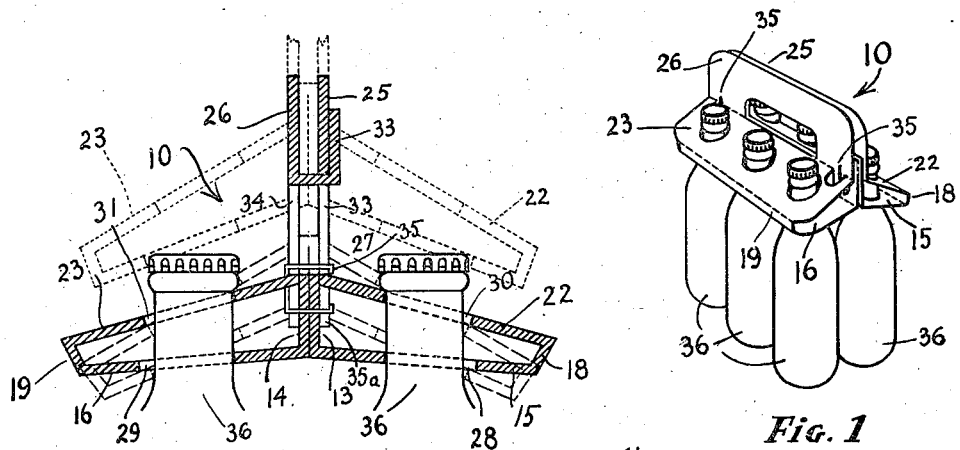
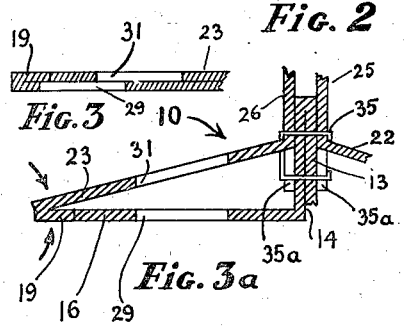
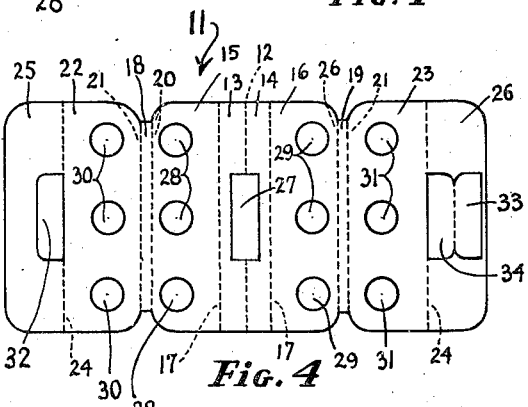
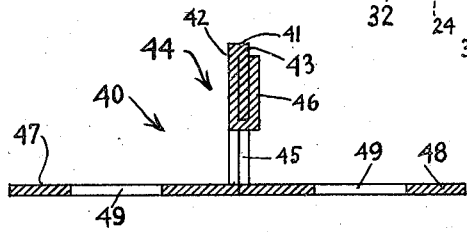
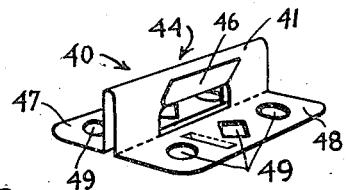
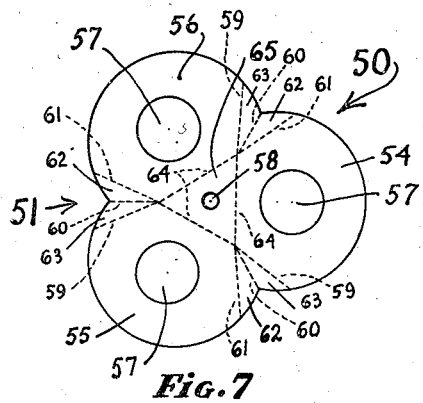
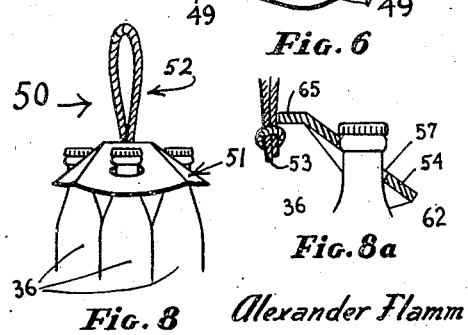
Alexander Flamm
INVENTOR
BY John F. Hanrahan
ATTORNEY Sept. 28, 1943. A. FLAMM 2,330,699
CONTAINER CARRIER
Filed Feb. 21, 1942 2 Sheets-Sheet 2
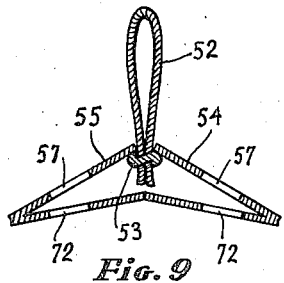
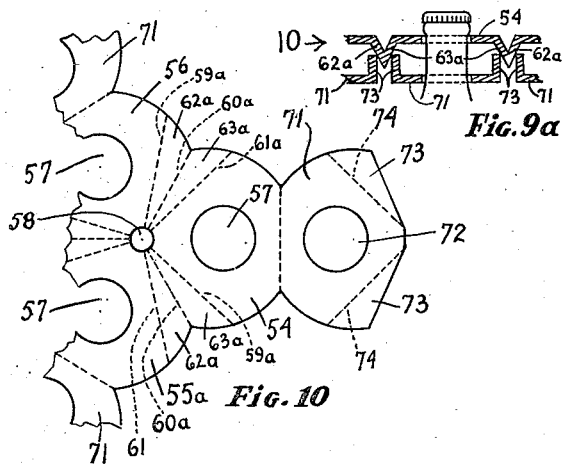
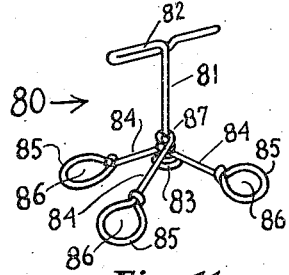
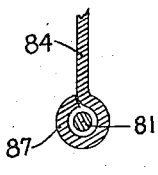
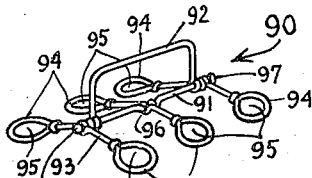
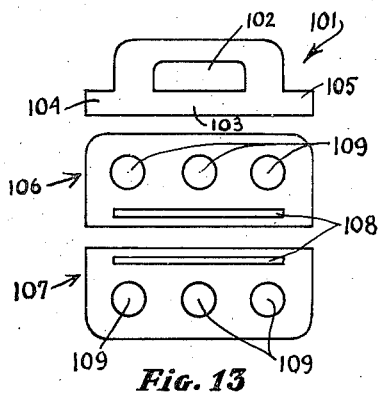
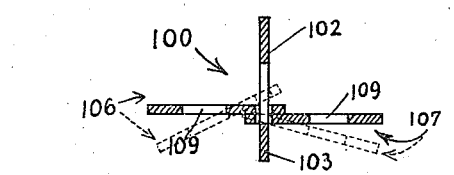
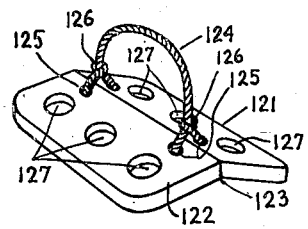
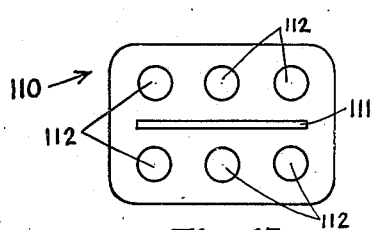
Alexander Flamm
INVENTOR
BY
ATTORNEY

Patented Sept. 28, 1943

2,330,699

UNITED STATES PATENT OFFICE 2,330,699

CONTAINER CARRIER

Alexander Flamm, Fairfield, Conn.

Application February 21, 1942, Serial No. 431,887

7 Claims. (Cl. 294—87)

This invention relates to new and useful improvements in carriers for containers and has particular relation to that type of carriers usually employed for the carrying of a plurality of bottles of soda or soft drink.

The invention has for an object to provide a carrier of the type indicated and which for its manufacture requires a minimum of material.

A further object is to provide a carrier of the kind suggested and which may be easily and quickly loaded with containers whereby there is no loss of time in assembling the carrier with a plurality of containers.

Another object is to provide a carrier having the characteristics indicated and which securely holds the bottles or other containers but from which they may be removed with a minimum of effort.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings—

Fig. 1 is a perspective view showing a carrier of the invention in carrying association with a plurality of bottles;

Fig. 2 is an enlarged transverse sectional view through the carrier and showing two bottles assembled therewith, the full lines showing the relation of the carrier and the necks of the bottles when the carrier is first forced over such necks, the dash lines showing the lifting relation of the carrier to the necks of the bottles and the dotted lines showing the initial step in assembling the carrier on the bottles;

Fig. 3 is a detail sectional view through a portion of the carrier with the parts collapsed to show the extent to which a pair of openings through two walls of the carrier may be disposed out of alignment;

Fig. 3a is a detail sectional view through a portion of the carrier and showing the relation of the upper and lower walls of the carrier when a bottle is being removed from the carrier;

Fig. 4 is a plan view of the blank from which the carrier is folded or formed;

Fig. 5 is a transverse sectional view showing a modified construction of carrier;

Fig. 6 is a perspective view of the carrier of Fig. 5 on a reduced scale;

Fig. 7 is a plan view of the blank of another modified form of carrier;

Fig. 8 is a side elevational view, on a reduced scale, showing the carrier formed of the blank of Fig. 7 in carrying relation to a number of bottles;

Fig. 8a is a detail sectional view showing the manner in which the carrier of Figs. 7 and 8 engage the neck of a bottle;

Fig. 9 is a transverse sectional view through a carrier somewhat similar to that of Figs. 8 and 8a but slightly modified;

Fig. 9a is a detail sectional view through one of the folds or pleats of the carrier of Fig. 9;

Fig. 10 is a top plan view of a portion of the blank from which the carrier of Figs. 9 and 9a is folded;

Fig. 11 is a perspective view of another modified construction of carrier;

Fig. 11a is a detail sectional view showing construction of the carrier of Fig. 11;

Fig. 12 is a view similar to Fig. 11 but showing another modification;

Fig. 13 is a view of the various pieces, in disassembled relation, of another modification;

Fig. 14 is a transverse sectional view through the carrier of Fig. 13 in assembled condition;

Fig. 15 is a plan view of a modified construction of a part to be substituted in the carrier of Figs. 13 and 14; and Fig. 16 is a perspective view of yet another modification of the structure of the carrier.

Referring in detail to the drawings and at first more particularly to the form of the invention shown in Figs. 1 through 4, the improved carrier there shown and generally designated 10 in Fig. 1, 2, 3 and 3a is made up from the blank shown in Fig. 4 and generally designated 11. The various portions bear the same reference characters in blank 11 and carrier 10.

Blank 11 is formed of a single piece of cardboard or similar material which may be conveniently punched and folded to the required shape. The blank is provided with a central fold line 12 and then working out toward the opposite ends of the blank it includes a pair of portions 13 and 14 at opposite sides of fold line 12, a wider pair of lower wall portions 15 and 16 at the outer edges of portions 13 and 14 and separated from the latter by a fold or hinging lines 17. Next, working outwardly from the intermediate portion of the blank the latter includes a pair of connecting or hinge portions 18 and 19 defined by fold lines 20 and 21 at the outer sides of the latter of which are a pair of upper wall portions 22 and 23, separated by a fold or hinge lines 24 from handle or grip portions 25 and 26 respectively.

An elongated central opening 27 is punched in the material of the blank and the latter is also provided in portions 15, 16, 22 and 23 with rows of openings 28, 29, 30 and 31 respectively. Handle portion 25 has a piece cut or punched therefrom to provide a hand of finger opening 32 while at a similar point handle portion 26 has a portion 33 partially lanced and pressed therefrom to provide a corresponding hand or finger opening 34 and to provide the said portions 33 for a purpose to be described.

In making the carrier 10 the blank 11 is folded upon itself along the fold line 12 whereby to dispose portions 13 and 14 against one another (see Fig. 2). Next by folding along the lines 17 of the blank portions 15 and 16 are disposed at right angles to portions 13 and 14. Thereafter the blank is folded on the lines 20 and 21 to dispose hinge portions 18 and 19 in an upwardly directed relation to the portions 15 and 16 and with the portions 22 and 23 above portions 15 and 16 and inclining toward the portions 13 and 14. Folding the blank along the lines 24 now disposes the portions 25 and 26 in parallel relation extending upwardly at each side of the portions 13 and 14. Now the flap 33 is bent to pass through the opening 32 in portion 25 and is folded up against the latter as shown.

In the carrier formed from the blank as described the openings 32 and 34 register and form the portions 25 and 26 into a handle or grip while the flap 33 being disposed as described covers the lower edges of the portions 25 and 26 in the hand opening and leaves no sharp edges to cut into the hand of a person carrying the device. In addition the said flap helps to maintain the handle portions 25 and 26 against one another. Also in this folded structure the opening 27 provides clearance through portions 13 and 14 whereby there is plenty of finger room so that the described handle may be conveniently used.

When the carrier has been formed as described it may be secured in folded relation in any suitable manner as by means of a pair of staples 35 driven through the adjacent parts of portions 25, 13, 14 and 26 at each side of the hand opening as shown. Preferably tabs 35a are lanced and pressed from the upper walls or portions 22 and 23 and secured by the staples whereby the latter serve to stiffen the entire handle structure and prevent its separation or opening.

The walls 15 and 16 are spaced below the walls 22 and 23 respectively and such lower walls are of less width than the respective upper walls. This difference in width is such that when the upper and lower walls are pressed toward one another and the connecting or hinge portions 18 and 19 are in the planes of the lower walls (see Fig. 3a) the combined widths of the lower walls and their respective hinge portions 18 and 19 place the outer edges of such hinge portions the same lateral distance from the plane of the handle as are the outer edges of the upper walls the latter however being disposed at an angle declining from their inner edges where they are hinged to the handle.

The carrier 10 being formed by folding and stapling has a natural or normal condition somewhat as shown by the dotted lines in Fig. 2. There it is noted that the upper and lower walls decline from the handle structure and that the connecting portions 18 and 19 incline upwardly and outwardly from the outer edges of the lower walls. This places the rows of holes 28 and 29 in the lower walls laterally outwardly of the rows of holes 30 and 31, respectively, in the upper walls of the carrier.

From the mentioned figure it will be clear that while the holes in the upper and lower walls overlap to some extent the forward or outer edges of the holes in the lower walls are outwardly of the corresponding edges of the holes in the upper walls and that the rear edges of the holes in the lower walls are in advance or outwardly of the corresponding edges of the holes in the upper walls.

All of the mentioned holes are of the same or approximately the same diameter. The centers of a pair of holes, measured lengthwise of the carrier, are spaced apart the distance between the longitudinal axis of two containers arranged in or substantially in side-by-side contacting relation and the distance between the center of a hole at one side of the handle structure and the center of a corresponding hole at the other side of the handle structure is such that when the necks of two containers are disposed through openings in the carrier as shown in Figs. 1 and 2 the bodies of such bottles or containers are in or substantially in contact.

Generally containers (usually bottles) of the type here under consideration are sold six at a time and the carrier 10 is shown constructed for the carrying of such number of containers although it is to be understood that the invention is not limited to a carrier for any particular number of containers. With the carrier constructed as described six bottles 36 are arranged in two rows of three bottles each and with the bottles all in bodily contact.

They may be assembled in a shallow box or fixture so as to be correctly positioned in contacting relation without loss of time. By contacting relation is meant that in a row of three bottles the two end bottles contact the intermediate bottle and that with the two rows of bottles those in one row contact those opposite them but in the other row.

Now to apply the carrier 10 it is but necessary to dispose the lower walls 15 and 16 against the caps of the bottles with the holes in said walls aligned, lengthwise of the carrier, with the caps of the bottles. This as shown by the dotted lines in Fig. 2. Then the operator presses downwardly on the handle structure of the carrier. As that is done the lower carrier walls move toward horizontal positions and the connecting portions 18 and 19 are flattened or drawn somewhat into the planes of the lower walls and the upper and lower walls are pressed toward one another bringing the holes in the upper and lower walls at the respective sides of the handle more into alignment. As this happens the walls pass over the bottle necks and the carrier is associated with the necks of the bottles as shown by the full lines in Fig. 2.

As the carrier is forced onto the necks of the bottles 36 to the full line position of Fig. 2, in the manner described the bottles are forced slightly apart so that they are spaced from one another in all directions. Now by grasping the handle and lifting the carrier the bottles are lifted and may be transported simply by shifting the carrier through the use of the handle. When the carrier is lifted as suggested it moves relative to the bottles before the latter are lifted from a support. That is the carrier under a lifting force applied to the handle is shifted from the full line to the dash line position of Fig. 2.

There it will be noted that the rear edges of the holes in the upper walls 22 and 23 of the carrier are engaged under the rear edges of the bottle caps and that the front edges of such holes are engaged under or are located rather immediately under the bead found about the mouth of the bottle. At this time the holes in the lower walls of the carrier are so located that the rear or inner edges of such holes are against the bottle necks. However, whether the edges of the holes in the lower walls are in engagement with the bottle necks is not vital and such engagement may depend on the size of the holes and the angle of inclination of the said walls.

The lower walls of the carrier serve to strengthen the carrier in that they function somewhat in the way of a truss structure to brace the upper walls. In addition as a forward or rear edge of the hole in a lower wall engages the bottle neck it tends to push the said neck against the opposite edge of the corresponding hole in the upper wall of the carrier whereby the bottle is securely held.

A further advantage of the lower wall is that should the neck of a bottle slip from the hole in the upper wall of the carrier said bottle neck will be caught and held by the hole in the lower wall of the carrier. However, in tests made it does not appear that there is any likelihood of the bottle neck casually moving from or being casually released from the hole with which it is engaged in the upper carrier wall.

Any casual release of the bottle by the upper wall is really prevented by the lower wall. Thus in carrying position the lower and upper walls are at different angles and the holes in such walls are not in true vertical alignment and the walls have a tendency to move to take the holes further out of alignment. Therefore an edge of an opening in one wall is engaging the neck of a bottle and forcing such neck against an opposite edge of the corresponding hole in the other wall so that the bottle is held with a sort of binding action.

This in addition to the fact that the upper wall being at an angle the opposite edges of its holes are bindingly engaging opposite sides of the bottle neck at different elevations. Due to the fact that the holes are at an angle to the longitudinal axis of the bottle necks the effective diameters of the holes is less than the diameters of the bottle necks and the latter are securely held.

When a bottle is to be removed from the carrier the operator merely grasps the upper and lower walls of the carrier in the vicinity of the bottle that is to be removed and forces or squeezes them toward one another. That is the walls may be squeezed toward one another between the thumb and forefinger. This causes the corresponding holes of the upper and lower walls to be brought into alignment or substantially into alignment due to a shifting of the walls by rocking them on the hinge portions 18 and 19. When the upper and lower holes are aligned a bottle may be easily removed from the carrier simply by withdrawing the neck of the bottle from the aligned holes.

Such squeezing accompanied by a rocking of the connecting portion (18 or 19) between a pair of the walls brings the connecting portion into the plane of the lower wall and a flattening of the latter substantially into a horizontal plane as in Fig. 3a. Thus in the described operation the connecting portion hinges about the fold lines 20 and 21. This particular structure is not vital as the connecting portions may be represented by curves or bends and need not be marked off by sharp creases but serves in any instance as a sort of hinge.

The important point is that squeezing and rocking of the upper and lower walls toward one another in the manner indicated changes their relation toward one another in such manner that the corresponding holes in the upper and lower walls are brought into alignment or substantially into alignment whereby a bottle may be easily and conveniently removed from the carrier. When the bottles are lifted by the carrier their relation to one another changes slightly in that the bottles of the rows tend to swing into contacting relation. That is, the three bottles in one row move into engagement with the bottles in the corresponding positions in the next row.

During transportation the bottles are all against one another and while they may move relatively they do not have any actual tendency to do so and there is little if any clicking of the bottles against one another if any reasonable care is exercised. To prevent any rattling of the bottles against one another a rubber band may be snapped about their bodies or a piece of adhesive paper may be placed about the body portions of the bottles securing them together in contact during transportation, as from a store to the home.

The carrier of the invention is not limited to use for the carrying of any particular size or shape of container. Fig. 3 shows the upper and lower walls flattened against one another with connecting portion 19 forming an extension of wall 23. This throws hole 31 almost completely out of registry with hole 29. The position of connecting portion 19 is reversed in Fig. 3a and there it forms an extension of wall 16 so that the holes 29 and 31 are in alignment or substantially in alignment.

Thus by moving the upper and lower walls on their hinging fold lines with the handle structure and with the connecting portions 18 and 19 functioning hinge-like as described, the walls may be shifted relatively between positions where the holes of the upper and lower walls are in alignment to positions in which said holes are substantially out of alignment. The size of the bottle neck in comparison with the size of the mentioned holes determines the extent to which the holes are out of alignment when the device is being used to carry the bottles.

When the bottles being carried are empty the holder engages under the usual lip or bead found about the mouths of the bottles. The carrier of the invention may be made of a wide variety of materials and while a one piece structure seems preferred the invention is not limited to such a structure or to a hinge structure as shown at 18 and 19.

It seems important that the upper and lower walls be relatively movable so that the bottle neck receiving openings may be moved to and from alignment whereby to have the bottle necks released when the walls are positioned with the openings aligned and whereby to have the bottle necks gripped when the carrier and bottles are supported from the handle structure. A variety of shapes of holes may be used and their diameters are not critical.

Referring now particularly to Figs. 5 and 6 of the drawings the carrier there shown and generally designated 40 is formed or folded from a single length of any suitable material, as cardboard or the like. In making carrier 40 the material is bent upon itself midway its ends as at 41 to provide a pair of parallel portions 42 and 43 comprising a handle structure 44. Portion 43 has an opening 45 therethrough while a flap 46 is partly lanced and pressed from portion 42 and passed through the opening 45 as and for the purpose of the flap 33 of Figs. 1 through 4.

Beyond the portions 42 and 43 the material of the carrier is bent to extend outwardly from said portions as substantially at right angles thereto providing portions 47 and 48 each having a row of holes 49 therein and located one at each side of the handle 44. Holes 49 are of such diameters as to freely pass over the caps of containers to be carried and may be of the desired shape. In this latter connection it is noted that while the intermediate hole 49 at one side of handle 44 in Fig. 6 is diamond shape the holes at the outer sides of such intermediate hole are round and oval, respectively.

When using carrier 40 (shown as adapted for the carrying of six bottles but not limited to any particular number) the bottles or containers to be carried may be arranged in a group and the carrier is pushed down over their necks as in the description of the carrier 10. Alternatively the bottles may one at a time be picked up and their capped ends inserted through the holes 49 it being understood that such holes are not necessarily a snug fit over the bottle caps.

Then on picking up the carrier by the handle 44 the relation of the carrier to the bottles changes and the weight of the bottle coming onto the carrier the portions 47 and 48 bend downward from the handle. The carrier portions 47 and 48 being out of right angular relation to the handle this disposes the holes 49 in inclining relation to the bottle necks so that the inner edges of the holes are against the bottle necks and just under the edges of the bottle caps while the outer edges of the holes engage the opposite sides of the bottle necks and at points lower than those engaged by the first considered edges of the holes.

Generally the bodies of the bottles below the carrier come into engagement when the bottles are lifted by the carrier if said bodies were not in such relation prior to being lifted by the carrier. In this way the bottles serve to assist in maintaining one another in vertical positions while the carrier portions 47 and 48 are at an incline to the vertical so that the necks of the bottles are clampingly engaged by the inner and outer edges of the holes 49 at different elevations along the necks of the bottles.

In the modification of Figs. 7 and 8 the carrier of the invention is generally designated 50 and comprises a body 51 and a handle 52 the latter comprising a short length of small diameter rope or the like formed into a loop and connected with the body 51 in any suitable manner as by being passed through the body and having the knot 53 at the underside of the central portion of the body. Body 51 is generally trifoilate and in each of its leaf-like portions 54, 55 and 56 is provided with an opening 57. The body is punched out of a flat sheet and centrally is provided with a hole 58 for the passage of the handle 52. Between the leaves the body is creased along the dotted lines 59, 60 and 61 providing triangular portions 62 and 63. In addition the body is creased along the dotted lines 64 which define a central portion 65 having the hole 58 therethrough.

The carrier being formed by the assembly of the body and handle the body may be placed over the necks of three bottles and the holes 57 are of such size as to pass freely over the caps of the bottles. Thereafter when the carrier is lifted by the handle 52 the leaves of the body move downwardly under the weight of the bottles as into the relation shown in Fig. 8. Also the body folds along the lines of the creases 59, 60 and 61 with the result that the triangular portions 62 and 63 fold against one another providing truss-like structures bracing and strengthening the body to stiffen it against the load imposed on it.

The bodies of the bottles are against one another and mutually contribute to maintain one another in vertical position while the leaves 54, 55 and 56 are in declining relation to the center of the body with the holes 57 engaging opposite sides of the necks of the bottles at different elevations to clampingly clasp the bottle necks as will be understood.

Unless the single walled structures are made of a heavy material they are likely to go out of shape under the weight of the filled bottles. However with the single walled structures the bottles may be easily removed from the carrier simply by swinging the bottles into aligned relation with the holes in the carriers or while the bottles are held the wall of the carrier may be pushed into normal relation to the necks of the bottles and the carrier lifted off the bottles freeing them. The pleats formed between the leaves of carrier 50 may be formed between the holes of carrier 40 and half pleats may be formed at the ends of the portions 47 and 48 of carrier 40 if that is desired. This would stiffen and brace the walls or portions 47 and 48 to a considerable extent if that is desired.

Figs. 9, 9a and 10 show a slight modification of the carrier 50 and while the carrier of Figs. 9, 9a and 10 is generally designated 70 where the parts are the same as in the carrier 50 they have been given the same reference character. The instant modification comprises the providing of a double walled structure in a carrier particularly adapted for the carrying of three bottles or other containers. Thus carrier 70 has extensions 71 on the outer ends of its leaves 54, 55 and 56 and each extension is provided with an opening or perforation 72 corresponding with the hole or opening 57 of its leaf.

In addition on a pair of edges each extension 71 is provided with a pair of wing-like portions 73 defined by a crease indicated by the dotted lines 74 in Fig. 10. The extensions 72 are folded under the leaves 54, 55 and 56 and with the wing-like portions 73 against the ribs formed by the pleat portions 62a and 63a as will be understood. In the assembled structure the holes 72 are slightly out of alignment with the holes 57 as shown in Fig. 9 and this device may be assembled onto three bottles in the manner described when considering Figs. 1 through 4.

That is the device 70 may be simply pushed down over the necks of the three bottles or other containers. To release the containers from carrier 70 the upper and lower walls of the latter, as defined by leaves 54, 55 and 56 and extensions 71 are pushed together and moved relatively to align the openings 72 and 57 after which the bottles are easily freed from the carrier. The portions 62a and 63a while similar to the portions 62 and 63 of carrier 50 do not stop short of the center of carrier 70 but extend to the opening 58 for the handle. However, these portions serve to brace the structure and stiffen it and the wing-like portions 73 cooperate with the pleats or portion 62a and 63a as shown in Fig. 9a.

Fig. 11 shows a carrier made of strands as of wire, rope, twine or the like. This carrier generally designated 80 comprises a strand forming a stem 81 and a cross piece 82 said stem and cross piece comprising a handle by which the device may be carried. At its lower end the stem is twisted into a knot or enlargement 83. The desired number of holders 84 (here shown as three) are connected with the handle structure described and each comprises a length of wire one portion of which is twisted to provide a loop structure 85 having an opening 86 therethrough of such diameter that the capped end portion of a bottle or other container may freely pass therethrough when normal thereto.

The inner ends 87 of the holders 84 are bent about the stem 81, one over the other vertically along the stem but free for vertical movement along the stem and for turning movement about the stem. With this construction the holders may assume positions declining from the stem 81 (this is true when the holders are of wire or other stiff material) so that when a bottle neck is inserted through the opening 86 of a holder and the device is lifted by the handle structure the mentioned holder assumes an inclined position so that its opening 86 is not normal to the longitudinal axis of the vertically positioned container. Therefore the inner and outer edges of the opening 86 engage the container neck at opposite sides thereof and at different elevations and the container is securely held.

When three containers are in the carrier 80 their bodies are against one another and mutually contribute to the support of one another in that they help to maintain one another vertical and against casual swinging movement. To remove a container from the carrier it is but necessary to shift the bottle or to shift a holder 84 to dispose an opening 86 normal to the longitudinal axis of the bottle when the parts may be freely separated as in such relation the opening 86 will pass freely over the end of the bottle neck.

In the modification of Fig. 12 is shown a wire or similar stranded carrier. The carrier designated 90 comprises a bar 91 about which is wrapped the ends of a wire loop 92 comprising a handle. Extending outwardly from opposite sides of the bar 91 are a series of holders 93 each of a length of wire one end portion of which is twisted to provide a loop structure 94 having an opening 95 therethrough of a diameter to pass freely over the capped end of a container when normal thereto.

The inner ends of the holders 93 are bent about the bar 91 but are not bound thereagainst so that the holders may be swung relative to the bar. Approximately midway its ends the bar 91 is provided with an off-set 96 about which the inner ends of the intermediate holders are wrapped and the ends of this off-set serve to prevent the intermediate holders moving longitudinally of the bar 91. Thus such holders are maintained spaced from the end holders at the respective sides of the bar. These end holders are held in place by the looped ends of the handle 92 and the headed ends 97 of the bar.

With the described construction the holders of carrier 90 may be pushed over the necks of six assembled bottles as will be understood from the descriptions of the previous forms. Then as the carrier is lifted by the handle 92 the holders 93 swing or rock about the bar 91 to positions declining from the handle and the bar so that the openings 95 are no longer normal to the necks of the bottles or other containers but are inclined relative thereto and engage said necks at their opposite sides and at different elevations so that the containers are securely held as will be understood.

To release a bottle from the carrier it is but necessary to move the bottle and holder relatively to align the hole 95 with the longitudinal axis of the container and then the holder may be lifted off the bottle neck. Alternatively the bottle may be lifted or pulled from the holder. Since the holders 93 are pivoted on or turnable about the bar 91 it will be clear that a bottle may be grasped and used as a handle to swing its holder into a vertical position after which the bottle is removed from its holder by a horizontal movement.

Figs. 13 and 14 show a three piece construction of carrier which may be made of a plastic material, cardboard, plywood or the like. This carrier generally designated 100 comprises a handle member 101 including a looped handle structure 102 and a cross piece 103 extending beyond the ends of the handle loop at 104 and 105. Two holders 106 and 107 are adapted to be assembled on the handle member and for this purpose each has a slot 108 which may be passed freely over the loop portion 102 as shown in Fig. 14.

In addition these holders are provided with holes or openings 109 each of a size or diameter to pass freely over the capped end of a bottle or other container. The carrier 100 may be assembled on a number of bottles arranged into a compact group by pushing the carrier over the necks of the bottles as will be understood.

Thereafter when the carrier is lifted the holders 106 and 107 tilt under the weight of the load placed on them and thus their openings 109 are disposed slantwise of the necks of the bottles to engage said necks at opposite sides and at different elevations. This tilting is permitted when the holders are of rigid material due to the free fit of the loop 102 through the slots 108. To remove a bottle from the carrier it is but necessary to have the bottle's holder normal to the longitudinal axis of the bottle when the latter is easily removed from the holder owing to the diameter of the opening 109 through which the bottle's neck has been disposed.

The one piece holder 110 of Fig. 15 is adapted to be substituted for the two parts 106 and 107 of Figs. 13 and 14. Holder 110 is of paper, cardboard, Celluloid or other flexible material and has a slot 111 to be passed over the handle loop 102 and is further provided with holes or openings 112 of a diameter and for a purpose that will be understood from the description of Figs. 13 and 14. Piece 110 being of a flexible or bendable material its portions at opposite sides of the handle bend downwardly (approximately to an angle of 60 degrees) under the weight of containers so that the edges of its holes or openings 112 engage opposite sides of the container necks at different elevations as and for the purpose described in connection with other forms of the invention.

Fig. 16 shows a carrier generally designated 120 and comprising a pair of complemental holders 121 and 122 of wood, cardboard, metal or the like. These holders have inclined abutting edges 123 whereby they normally are disposed in angular relation. A handle 124 in the form of a piece of rope of small diameter has its ends passing through holes 125 in the holders and then looped and tied as at 126.

In this way the holders are secured together and the handle is secured to the holders to make a carrier and the holders may have a relative movement about their abutting edges. Each holder is provided with the desired number of holes or openings 127 and such holes are of a size whereby the capped ends of containers may be passed freely through the holes when normal thereto.

However, when the carrier 120 is being supported by handle 124 the holders 121 and 122 are declining from the handle so that the holes cross the necks of the containers at an angle and engage opposite sides of the necks at different elevations whereby the bottles are secured to the carrier.

To remove a bottle from the carrier the parts are given such relative movement that the longitudinal axis of the bottle is normal to the opening 127 and then the bottle is easily withdrawn from the carrier. While the holders are shown as having bevelled abutting edges it will be understood that the invention is not limited to this construction as the holders may have rounded or other shapes of abutting edges on which to move relatively when secured together.

Having thus set forth the nature of my invention, what I claim is:

1. In a carrier for a plurality of necked containers, said carrier formed of a single length of cardboard-like material bent upon itself and providing a handle and at each side thereof a pair of vertically spaced upper and lower walls hingedly connected at their outer edges, means hingedly connecting the inner edges of said walls with said handle, said walls having pairs of openings therethrough of which one opening in each wall comprises one of a pair, and each of said pairs of openings being adapted to receive a container neck and bindingly grip the same when the carrier is suspended by said handle.

2. In a device for carrying a plurality of containers, a handle, holders supported by said handle and each comprising upper and lower walls, said walls having pairs of openings therein of which corresponding openings in each of an upper and a lower wall comprise a pair, said walls hingedly connected at their outer ends, means at their inner ends hingedly connecting said walls at vertically spaced points with said handle whereby the walls may be moved relatively to bring said pairs of openings into and out of registry, each of said pairs of openings being adapted to receive a container neck and to assume positions declining from said handle whereby to have the upper wall engage opposite sides of the container necks at vertically spaced points to support the containers when the carrier is suspended by said handle, said lower wall at such time preventing such relative movement of the container necks and the upper wall as to have the necks normal to the openings in the upper wall, and said lower and upper walls when moved relatively adapted to bring the pairs of openings into registry to permit of the separation of the containers from the carrier.

3. The carrier device of claim 2 formed of a single length of material folded upon itself to provide the handle, the upper and lower walls and the hinge connection at the outer ends of the walls.

4. In a container carrier, a handle, a pair of upper and lower walls, means hingedly connecting said walls at their inner edges to said handles with the walls of the pairs in vertically spaced relation, said walls having pairs of openings of which corresponding openings in each of an upper and a lower wall comprise a pair, each of said pairs of openings adapted to receive a container neck, and the openings of said pairs of openings so related that as the lower walls are moved toward positions normal to the handle the holes of the pairs are moved toward registration.

5. In a container carrier, a handle, a pair of upper and lower walls at each side of and at their inner edges hingedly connected with said handle, said walls of the pairs hingedly connected at their outer edges, said walls having pairs of openings of which corresponding openings in each of an upper and a lower wall comprise a pair, each of said pairs of openings adapted to receive a container neck, and the openings of said pairs of openings so related that as the lower walls are moved toward positions normal to the handle the holes of the pairs are moved toward registration.

6. In a container carrier, a handle, a pair of upper and lower walls at each side of said handle, said walls hingedly connected at their inner edges to said handle with the walls of the pairs in vertically spaced relation, means hingedly connecting the outer edges of the walls of said pairs, said walls having pairs of openings of which corresponding openings in each of an upper and a lower wall comprise a pair, said walls relatively movable on said hinged connections whereby the walls may be moved relatively to align and disalign the holes of the pairs.

7. In a device for carrying a plurality of containers, a handle, holders supported by said handle and each comprising upper and lower walls, said walls having pairs of openings therein of which corresponding openings in each of an upper and a lower wall comprise a pair, intermediate portions hingedly connected at their respective edges with the outer edges of the walls of the pairs, means at their inner ends hingedly connecting said walls at vertically spaced points with said handle whereby the walls may be moved relatively to bring said pairs of openings into and out of registry, each of said pairs of openings being adapted to receive a container neck and to assume positions declining from said handle whereby to have the upper wall engage opposite sides of the container necks at vertically spaced points to support the containers when the carrier is suspended by said handle, said lower wall at such times preventing such relative movement of the container necks and the upper wall as to have the necks normal to the openings in the upper wall, and said lower and upper walls when moved relatively adapted to bring the pairs of openings into registry to permit of the separation of the containers from the carrier.

ALEXANDER FLAMM.